United States Patent
Kouno

(10) Patent No.: US 10,972,546 B2
(45) Date of Patent: Apr. 6, 2021

(54) IMAGE PROCESSING SYSTEM, CONNECTION MEDIATION SERVER, AND RECORDING MEDIUM

(71) Applicant: Konica Minolta, Inc., Tokyo (JP)

(72) Inventor: Takahiro Kouno, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 581 days.

(21) Appl. No.: 15/278,108

(22) Filed: Sep. 28, 2016

(65) Prior Publication Data
US 2017/0093985 A1 Mar. 30, 2017

(30) Foreign Application Priority Data

Sep. 29, 2015 (JP) .............................. JP2015-190728

(51) Int. Cl.
*G06F 15/16* (2006.01)
*H04L 29/08* (2006.01)
(Continued)

(52) U.S. Cl.
CPC .......... *H04L 67/141* (2013.01); *H04L 41/082* (2013.01); *H04L 65/1063* (2013.01); *H04L 67/10* (2013.01); *H04L 43/0817* (2013.01)

(58) Field of Classification Search
CPC ........ H04L 67/141; H04L 67/41; H04L 51/32
(Continued)

(56) References Cited

U.S. PATENT DOCUMENTS 7,440,124 B2 * 10/2008 Tabuchi ................... B41J 2/165
347/30

8,843,917 B1 * 9/2014 Harel ........................ G06F 8/65
717/173
(Continued)

FOREIGN PATENT DOCUMENTS

JP 2014-052793 A 3/2014

OTHER PUBLICATIONS

N. N. Dhage and S. D. Markande, "Bluetooth enabled printer adapter using raspberry pi," 2015 International Conference on Pervasive Computing (ICPC), Pune, 2015, pp. 1-4, doi: 10.1109/PERVASIVE.2015.7087018. (Year: 2015).*
(Continued)

*Primary Examiner* — Oscar A Louie
*Assistant Examiner* — Messeret F Gebre
(74) *Attorney, Agent, or Firm* — Osha Bergman Watanabe & Burton LLP

(57) ABSTRACT

An image processing system includes: an application server installed on a network; an image processing device installed on a local network connected to the network; a relay server, installed on the local network, that relays communication between the image processing device and the application server; and a connection mediation server, installed on the network, that transmits a connection request to the relay server to cause the relay server to connect to the application server. The connection mediation server includes a request accepting circuit, and a connection request circuit, the relay server includes a connection establishment circuit, and in a case where a communication request is accepted, the connection request circuit transmits the connection request to the relay server, and in a case where a new communication request is accepted, the connection request circuit does not transmit the connection request to the relay server.

14 Claims, 12 Drawing Sheets

(51) Int. Cl.
  *H04L 12/24* (2006.01)
  *H04L 29/06* (2006.01)
  *H04L 12/26* (2006.01)

(58) Field of Classification Search
  USPC .................................................. 709/227, 206
  See application file for complete search history.

(56) References Cited

U.S. PATENT DOCUMENTS

| | | | | |
|---|---|---|---|---|
| 2006/0007469 | A1* | 1/2006 | Uruma | H04N 1/0035 358/1.14 |
| 2006/0031420 | A1* | 2/2006 | Ferguson | G06F 8/65 709/219 |
| 2008/0028078 | A1* | 1/2008 | Saiki | H04L 63/0272 709/227 |
| 2008/0183887 | A1* | 7/2008 | Klemets | H04L 29/06 709/231 |
| 2010/0135280 | A1* | 6/2010 | Ikegami | H04M 3/42068 370/352 |
| 2010/0208874 | A1* | 8/2010 | Anupam | H04M 3/42 379/88.22 |
| 2012/0293837 | A1* | 11/2012 | Mori | H04N 1/00244 358/1.15 |
| 2014/0047432 | A1* | 2/2014 | Michishita | G06F 8/65 717/173 |
| 2014/0068597 | A1 | 3/2014 | Hirahara | |
| 2014/0156852 | A1* | 6/2014 | Moon | G06F 11/3664 709/226 |
| 2015/0242164 | A1* | 8/2015 | Takeuchi | G06F 3/1212 358/1.14 |

OTHER PUBLICATIONS

Samsung electronics co ltd india software operations (SISO) files patent application for a method and a system for determining the print properties for a print job in a shared printer or a multifunction peripheral (MFP). (Apr. 14, 2011) (Year: 2011).*

R. Zimering and R. Allen, "Computerization of a Large Relay Setting File," in IEEE Transactions on Power Delivery, vol. 1, No. 1, pp. 135-142, Jan. 1986, doi: 10.1109/TPWRD.1986.4307899. (Year: 1986).*

* cited by examiner

| | 19 | |
|---|---|---|
| 18a | 18b | 18c |
| SPECIFIED IMAGE PROCESSING DEVICE | PROCESSING CONTENT | AMOUNT OF DATA |
| IMAGE PROCESSING DEVICE 14a | FIRMWARE UPDATE | **MB |

| 20a | 20b | 20c |
|---|---|---|
| IMAGE PROCESSING DEVICE | PROCESS BEING EXECUTED | CONNECTION |
| IMAGE PROCESSING DEVICE 14a | FIRMWARE UPDATE | NOT ALLOWED |
| IMAGE PROCESSING DEVICE 14b | --- | ALLOWED |

PRIOR ART

IMAGE PROCESSING SYSTEM, CONNECTION MEDIATION SERVER, AND RECORDING MEDIUM

The entire disclosure of Japanese Patent Application No. 2015-190728 filed on Sep. 29, 2015 including description, claims, drawings, and abstract are incorporated herein by reference in its entirety.

BACKGROUND OF THE INVENTION

Field of the Invention

The present invention relates to an image processing system, a connection mediation server, a relay server, and a program, and more particularly, to a technology for relaying communication between a server on the Internet and an image processing device.

Description of the Related Art

Conventionally, various application servers for a SaaS (Software as a Service) application and the like are installed on clouds on the Internet, and cloud services are provided by the application servers via the Internet. A cloud service is available at any time and in any place as long as connection to the Internet is allowed, and is highly convenient. As one use mode of a cloud service, data of a document or the like is accumulated in an application server, and printing of the data is performed by transferring the data from the application server to an image processing device installed on a local network in an office, for example. Also, in recent years, there is provided a service for managing a program for updating firmware of an image processing device in an application server, and for updating the firmware by downloading the firmware program to the image processing device from the application server.

However, a firewall is present between a local network and the Internet. Accordingly, even if a user issues a printing instruction to an application server, data cannot be transferred to an image processing device installed on the local network from the application server on the Internet. An image processing system as shown in FIG. 14 is therefore proposed to enable such data transfer, for example.

The conventional image processing system shown in FIG. 14 includes, on Internet 100, an application server 110, and a connection mediation server 112 for mediating connection state establishment between the application server 110 and an image processing device 122 installed on a local network according to a request from the application server 110. On the other hand, on a local network 101 such as an office LAN (Local Area Network), there are provided a relay server 120 for relaying communication between the image processing device 122 and the application server 110 according to a request from the connection mediation server 112, and the image processing device 122. When activated by application of power, the relay server 120 establishes a connection state 130 to the connection mediation server 112 installed on the Internet 100. The connection mediation server 112 is thereby placed in a regular connection state to the relay server 120 installed on the local network 101 through the firewall.

Processes by the image processing system for establishing a connection state between the image processing device 122 and the application server 110, and for transferring data from the application server 110 to the image processing device 122 will be described. First, the application server 110 transmits a communication request D200 specifying the image processing device 122 to the connection mediation server 112. Upon receiving the communication request D200, the connection mediation server 112 identifies the relay server 120 managing the image processing device 122, based on information that is registered in advance, and transmits a connection request D202 requesting establishment of a connection state to the application server 110 to the relay server 120. The connection request D202 includes address information such as an URL (Uniform Resource Locator) of the application server 110. Upon receiving the connection request D202 from the connection mediation server 112, the relay server 120 transmits a connection start request D204 to the application server 110 based on the address information included in the connection request D202. The relay server 120 and the application server 110 are thereby placed in the connection state, and the application server 110 is enabled to start data transfer to the image processing device 122 via the relay server 120.

Depending on the amount of data transferred from the application server 110, the performance of the image processing device 122 is sometimes reduced by the image processing device 122 executing processes according to the data. Or in the case of downloading a firmware program from the application server 110, update of firmware is performed by the image processing device 122 based on the downloaded program. This may disable communication of the image processing device 122 with other devices during the update process. However, the connection mediation server 112 outside the local network does not constantly keep track of the status of the image processing device 122. Accordingly, if the connection mediation server 112 receives the communication request D200 for the image processing device 122 from another application server 110 in a state where the performance of the image processing device 122 is reduced or communication with other devices is not possible, the connection mediation server 112 transmits the connection request D202 to the relay server 120, and causes the relay server 120 to establish a connection state to the application server 110. However, in the case where the performance of the image processing device 122 is reduced, communication may become difficult, that is, it may take time to receive data from the application server 110, for example. Also, in the case where the image processing device 122 is not allowed to perform communication, data cannot be received from the application server 110. That is, if the connection state to the application server 110 is established by the relay server 120 in a state where communication is disabled or difficult for the image processing device 122, data cannot be desirably transferred from the application server 110, and the established connection state is wasted.

Additionally, there is proposed a monitoring device that issues an update instruction to an image forming device on a local network when update firmware is stored in a server on the Internet, and that monitors a process of the image forming device downloading the update firmware from the server and updating the firmware (for example, JP 2014-52793 A). According to the monitoring device, if update of firmware cannot be performed due to the image forming device being in a communication disabled state, the instruction for updating the firmware is re-issued to the image forming device. Update of firmware may thereby be reliably performed by the image forming device.

When a notification from the server is received, the monitoring device of JP 2014-52793 A instructs the image forming device to perform update, regardless of whether the image forming device is in a state where communication is enabled or in a state where communication is disabled, and instructs the image forming device to communicate with the server. On the other hand, the local network of the image processing system described above is connected to the network through the firewall, and thus, the connection state to the application server 110 is established by the relay server 120 to perform communication. Accordingly, if, like the monitoring device of JP 2014-52793 A, the connection mediation server 112 transmits the connection request D202 to the relay server 120 regardless of the state of the image processing device 122, the relay server 120 establishes the connection state to the application server 110 without fail. However, if communication by the image processing device 122 is not enabled or is difficult, the established connection state is wasted. Accordingly, the situation described above cannot be improved by the technology of JP 2014-52793 A.

SUMMARY OF THE INVENTION

One or more embodiments of the invention provide an image processing system, a connection mediation server, a relay server, and a program for preventing occurrence of a useless connection state to thereby eliminate unnecessary processing load on the relay server.

According to an aspect of the invention, an image processing system comprises: an application server installed on a network; an image processing device installed on a local network that is connected to the network through a firewall; a relay server, installed on the local network, configured to relay communication between the image processing device and the application server; and a connection mediation server, installed on the network, configured to transmit a connection request to the relay server according to a communication request from the application server to cause the relay server to connect to the application server, wherein the connection mediation server includes a request accepting circuit configured to accept the communication request received from the application server, and a connection request circuit configured to transmit a connection request to the relay server in a case where the communication request is accepted by the request accepting circuit, the relay server includes a connection establishment circuit configured to establish a connection state between the application server and the image processing device in a case where the connection request is received from the connection mediation server, and in a case where a communication request for causing the image processing device to perform a predetermined process is accepted by the request accepting circuit, the connection request circuit transmits the connection request to the relay server according to the communication request, and in a case where a new communication request for the image processing device is accepted by the request accepting circuit while the predetermined process is being performed by the image processing device, the connection request circuit does not transmit the connection request according to the new communication request to the relay server.

An invention of Item. 2 is the image processing system of Item. 1, wherein, in a case where the predetermined process is performed at the image processing device, the image processing device may be placed, for a predetermined period of time, in a state where communication with another device is not possible.

An invention of Item. 3 is the image processing system of Item. 1, wherein a predetermined period of time or longer may be required when the predetermined process is performed at the image processing device.

An invention of Item. 4 is the image processing system of any one of Items. 1 to 3, wherein the relay server may further include a monitoring circuit configured to regularly monitor a state of the image processing device, and a status transmission circuit configured to transmit, to the connection mediation server, status information according to the state of the image processing device detected by the monitoring circuit, the connection mediation server may further include an information holding circuit configured to hold the status information received from the relay server, and if a communication request for the image processing device is accepted by the request accepting circuit in a case where status information indicating that the predetermined process has ended is held by the information holding circuit, the connection request circuit may transmit a connection request according to the accepted communication request to the relay server.

An invention of Item. 5 is the image processing system of Item. 4, wherein the connection mediation server may further include a response transmission circuit configured to refer to the status information that is held by the information holding circuit and to transmit a response according to the status information to the application server, in a case where the connection request according to the communication request for the image processing device is not transmitted to the relay server by the connection request circuit.

An invention of Item. 6 is the image processing system of Item. 5, wherein the response transmission circuit may be configured to add a processing time required for the predetermined process to the response, and to transmit the response to the application server.

An invention of Item. 7 is the image processing system of any one of Items. 4 to 6, wherein, in a case where a change in the state of the image processing device is detected by the monitoring circuit, the status transmission circuit may transmit the status information to the connection mediation server.

An invention of Item. 8 is the image processing system of any one of Items. 4 to 7, wherein the connection mediation server may further include a standby circuit configured to place a communication request for the image processing device in standby in a case where a connection request according to the communication request is not transmitted by the connection request circuit, and in a case where the status information indicating that the predetermined process has ended at the image processing device is received from the relay server, the connection request circuit may transmit a connection request to the relay server according to the communication request that is placed in standby by the standby circuit.

An invention of Item. 9 is the image processing system of any one of Items. 1 to 8, wherein the application server may include a communication request circuit configured to add identification information allowing identification of a process to be performed by the image processing device to the communication request, and to transmit the communication request to the connection mediation server, and the request accepting circuit may determine whether the communication request received from the application server is the communication request for causing the image processing device to perform the predetermined process or not, based on the identification information.

An invention of Item. 10 is the image processing system of any one of Items. 1 to 9, wherein a first image processing device and a second image processing device different from the first image processing device may be installed on the local network, and in a case where the predetermined process is being performed at the first image processing device, the connection request circuit may transmit a connection request for the second image processing device to the relay server.

According to an aspect of the invention, a connection mediation server, installed on a network, configured to transmit a connection request to a relay server that relays, according to a communication request from an application server installed on the network, communication between an image processing device installed on a local network connected to the network through a firewall and the application server to cause the relay server to connect to the application server, comprises: a request accepting circuit configured to accept the communication request received from the application server; and a connection request circuit configured to transmit the connection request to the relay server in a case where the communication request is accepted by the request accepting circuit, wherein, in a case where a communication request for causing the image processing device to perform a predetermined process is accepted by the request accepting circuit, the connection request circuit transmits the connection request to the relay server according to the communication request, and in a case where a new communication request for the image processing device is accepted by the request accepting circuit while the predetermined process is being performed by the image processing device, the connection request circuit does not transmit the connection request according to the new communication request to the relay server.

An invention of Item. 12 is the connection mediation server of Item. 11, and the connection mediation server may further comprise: an information holding circuit configured to hold status information according to a state of the image processing device received from the relay server; and a response transmission circuit configured to refer to the status information that is held by the information holding circuit and to transmit a response according to the status information to the application server, in a case where the connection request according to the communication request for the image processing device is not transmitted to the relay server by the connection request circuit.

An invention of Item. 13 is the connection mediation server of Item. 12, wherein the response transmission circuit may be configured to add a processing time required for the predetermined process to the response, and to transmit the response to the application server.

An invention of Item. 14 is the connection mediation server of any one of Items. 11 to 13, and the connection mediation server may further comprise a standby circuit configured to place a communication request for the image processing device in standby in a case where a connection request according to the communication request is not transmitted by the connection request circuit, wherein, in a case where the status information indicating that the predetermined process has ended at the image processing device is received from the relay server, the connection request circuit may transmit a connection request to the relay server according to the communication request that is placed in standby by the standby circuit.

According to an aspect of the invention, a relay server, installed on a local network connected to a network through a firewall, configured to relay communication between an image processing device installed on the local network and an application server installed on the network according to a connection request received from a connection mediation server installed on the network, comprises: a connection establishment circuit configured to establish a connection state between the application server and the image processing device in a case where the connection request is received from the connection mediation server; a monitoring circuit configured to regularly monitor a state of the image processing device; and a status transmission circuit configured to transmit, to the connection mediation server, status information according to the state of the image processing device detected by the monitoring circuit.

An invention of Item. 16 is the relay server of Item. 15, wherein, in a case where a change in the state of the image processing device is detected by the monitoring circuit, the status transmission circuit may transmit the status information to the connection mediation server.

According to an aspect of the invention, a non-transitory recording medium storing a computer readable program to be executed by a computer of a connection mediation server, installed on a network, that is configured to transmit a connection request to a relay server that relays, according to a communication request from an application server installed on the network, communication between an image processing device installed on a local network connected to the network through a firewall and the application server to cause the relay server to connect to the application server, causes the computer to execute: (a) accepting the communication request received from the application server; and (b) transmitting a connection request to the relay server in a case where the communication request is accepted, wherein, in (b), in a case where a communication request for causing the image processing device to perform a predetermined process is accepted in (a), the connection request is transmitted to the relay server according to the communication request, and in a case where a new communication request for the image processing device is accepted in (a) while the predetermined process is being performed by the image processing device, the connection request according to the new communication request is not transmitted to the relay server.

An invention of Item. 18 is the non-transitory recording medium storing a computer readable program of Item. 17, and the program may further cause the computer to execute: (c) holding status information according to a state of the image processing device received from the relay server; and (d) referring to the status information that is held in (c) and transmitting a response according to the status information to the application server, in a case where the connection request according to the communication request for the image processing device is not transmitted to the relay server.

According to an aspect of the invention, a non-transitory recording medium storing a computer readable program to be executed by a computer of a relay server, installed on a local network connected to a network through a firewall, configured to relay communication between an image processing device installed on the local network and an application server installed on the network according to a connection request received from a connection mediation server installed on the network, causes the computer to execute: (a) establishing a connection state between the application server and the image processing device in a case where the connection request is received from the connection mediation server; (b) regularly monitoring a state of the image processing device; and (c) transmitting, to the connection mediation server, status information according to the state of the image processing device detected in (b).

An invention of Item. 20 is the non-transitory recording medium storing a computer readable program of Item. 19, wherein, in (c), the status information may be transmitted to the connection mediation server in a case where a change in the state of the image processing device is detected.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a conceptual diagram showing an example of information included in a communication request that is transmitted from an application server to a connection mediation server according to one or more embodiments of the invention;

FIG. 3 is a conceptual diagram showing an example of information included in status information according to one or more embodiments of the invention;

DETAILED DESCRIPTION

Hereinafter, embodiments of the present invention will be described in detail with reference to the drawings. However, the scope of the invention is not limited to the illustrated examples. Additionally, in the embodiments described below, common members or structural elements are denoted by the same reference sign, and redundant description thereof is omitted.

Figure 1:
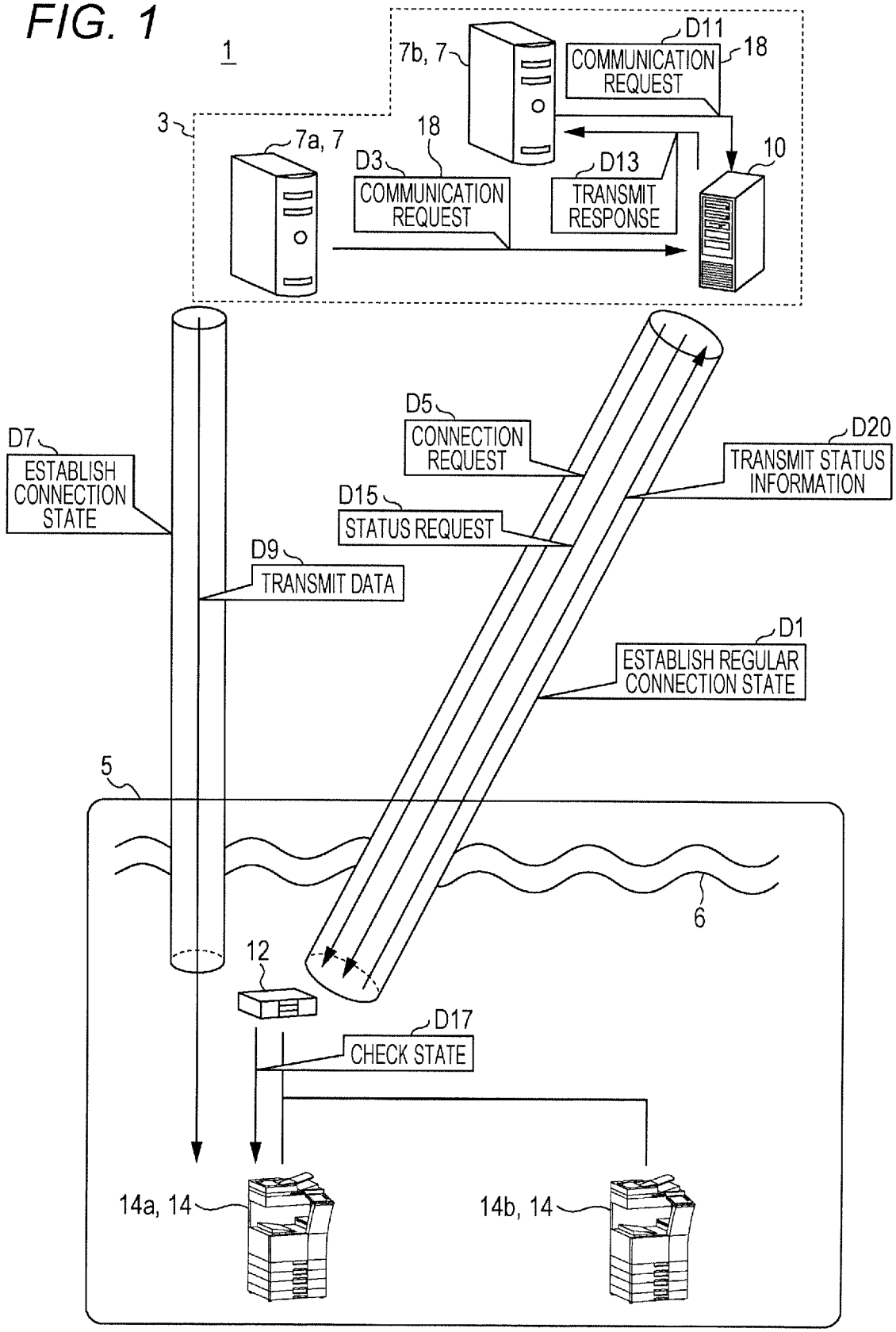
FIG. 1 is a diagram showing an example overall configuration of an image processing system according to one or more embodiments of the invention.

FIG. 1 is a diagram showing an example configuration of an image processing system 1 according to one or more embodiments of the invention. According to the image processing system 1, a plurality of application servers 7a (7) and 7b (7) and a connection mediation server 10 are provided on Internet 3 in a network environment where the Internet 3 and a local network 5, such as an office LAN, are connected through a firewall 6. The firewall 6, a relay server 12, and a plurality of image processing devices 14a (14) and 14b (14) are provided on the local network 5.

The application server 7 is a server that provides various application services such as a SaaS (Software as a Service). Or in the present embodiment, it is a management server that causes the image processing device 14 to update firmware, by storing update firmware for the image processing device 14 and by transmitting the update firmware to the image processing device 14 at predetermined timings. In the example in the drawing, two application servers 7a and 7b are provided, but the number of the application servers may be one, or two or more. The connection mediation server 10 is a server that, based on a request from the application server 7, mediates between the application server 7 and the specified one of the plurality of image processing devices 14a and 14b provided on the local network 5 so as to achieve a connection state where communication is enabled.

The firewall 6 is an interface that connects the local network 5, such as an office LAN, to the Internet 3. The firewall 6 allows access from a device installed on the local network 5 to a server on the Internet 3. When a connection state is established between a device installed on the local network 5 and a server on the Internet 3, the firewall 6 allows mutual communication between the device and the server. On the other hand, in a case where a connection state is not established between the device installed on the local network 5 and the server on the Internet 3, the firewall 6 blocks access from the server to the local network 5.

The relay server 12 is a gateway server that manages the image processing device 14, and that relays communication between the image processing device 14 and the application server 7. The image processing device 14 is configured as a multifunction peripheral, for example. The image processing device 14 executes a print job based on data or the like input via the local network 5. Also, in the case of connecting to the application server 7, the image processing device 14 may download an update firmware program from the application server 7 and update its firmware. In the example in the drawing, there are a plurality of image processing devices 14, i.e. the image processing device 14a and the image processing device 14b, but the number of image processing devices may be one. The image processing devices 14a and 14b are managed by the relay server 12.

In the image processing system 1, when activated by application of power, the relay server 12 establishes a regular connection state to the connection mediation server 10 on the Internet 3 through the firewall 6 (D1). The connection mediation server 10 is thereby allowed to perform communication at any time with the relay server 12 installed on the local network 5 through the firewall 6.

For example, in the case where an update firmware program to be installed on the image processing device 14a is stored in the application server 7a, the application server 7a transmits, to the connection mediation server 10, a communication request 18 specifying the image processing device 14a (D3). When the communication request 18 transmitted from the application server 7a is received, the connection mediation server 10 transmits, to the relay server 12, a connection request including the address or the like of the application server 7a (D5). When the connection request transmitted from the connection mediation server 10 is received, the relay server 12 transmits a connection start request to the application server 7a, and establishes a connection state to the application server 7a (D7). For example, the relay server 12 and the application server 7a are allowed to communicate over HTTP (Hypertext Transfer Protocol).

The application server 7a adds, to the communication request 18, identification information 19 about a content of processing to be performed by the image processing device 14a specified as the communication target and the amount of data to be transmitted, and transmits the information to the connection mediation server 10. In the present embodiment, the identification information 19 is information to be transmitted to the connection mediation server 10 by being added to the communication request 18, and is information for making the connection mediation server 10 identify the process to be performed by the image processing device 14 specified by the communication request 18. The connection mediation server 10 recognizes the content of processing to be performed by the image processing device 14a that is specified, by referring to the identification information 19 added to the communication request 18 received from the application server 7a. As will be described later, the connection mediation server 10 determines whether the process to be performed by the image processing device 14a based on the identification information 19 is a predetermined process which makes communication between the image processing device 14a and an external device impossible or difficult. In the case of the predetermined process, the connection mediation server 10 does not transmit (i.e., refrains from transmitting) a connection request, specifying the image processing device 14a, received from the application server 7b to the relay server 12 while the predetermined process is being performed by the image processing device 14a. FIG. 2 is a conceptual diagram showing an example of information included in the communication request 18 according to one or more embodiments of the invention. The communication request 18 includes specified image processing device information 18a specifying the image processing device 14a as the communication target, processing content information 18b about processing to be performed by the image processing device 14a, and data amount information 18c about the amount of data to be transmitted from the application server 7a to the image processing device 14a. Furthermore, for example, the processing content information 18b may include information indicating detailed processing contents, such as presence/absence of color setting and printing paper size in the case of a print job. The processing content information 18b and the data amount information 18c are included in the identification information 19. Furthermore, the identification information 19 is added to the communication request 18 at the time of generation of the communication request 18 by the application server 7a, and as shown in the drawing, the communication request 18 including the processing content information 18b and the data amount information 18c is generated.

Referring again to FIG. 1, when a connection state is established between the relay server 12 and the application server 7a, the application server 7a transmits data to the image processing device 14a (D9), and the relay server 12 relays the data transmitted from the application server 7a.

The image processing device 14a receives the data transmitted from the application server 7a and relayed by the relay server 12. In the case where an update firmware program is received from the application server 7a, the image processing device 14a installs the update firmware program, and updates its firmware. In the present embodiment, the image processing device 14a may automatically shut down in the process of updating the firmware and then be automatically restarted. That is, if restart is necessary to apply the firmware, the image processing device 14a shuts down after the firmware is installed, and then restarts by reading the newly installed firmware and applies the updated firmware to itself. Accordingly, during a certain period of time from the start to the end of update of the firmware, the image processing device 14a may be placed in a communication disabled state where communication with other devices is not allowed. In this case, when the image processing device 14a is restarted and the update process is complete, communication with other devices is enabled again.

If a communication request 18 specifying the image processing device 14a is transmitted from another application server 7b while update of firmware is being performed at the image processing device 14a (D11), when the communication request 18 is received, the connection mediation server 10 does not transmit a connection request to the relay server 12 in response to the communication request 18. That is, during update of firmware, the image processing device 14a is placed for a predetermined period of time in a state where communication with other devices is not allowed. If a connection request is transmitted in spite of the image processing device 14a being in a state where communication is disabled, a connection state to the application server 7b is established by the relay server 12 according to the connection request. Accordingly, when a communication request 18 for causing the image processing device 14a to perform a predetermined process such as update of firmware is received (D3), if a communication request specifying the image processing device 14a is newly received from the application server 7b (D11), the connection mediation server 10 does not transmit a connection request according to the newly received communication request 18 to the relay server 12. Accordingly, a connection state is not established between the relay server 12 and the application server 7b, and a process of establishing a useless connection state is avoided. Then, the connection mediation server 10 transmits, to the application server 7b, a response to the effect that connection is not possible because an update process for firmware is performed by the image processing device 14a (D13), for example. Additionally, if a communication request 18 specifying the image processing device 14b is received from the application server 7b while firmware is being updated at the image processing device 14a, the connection mediation server 10 transmits a connection request specifying the image processing device 14b to the relay server 12.

As described above, when the communication request 18 is received from the application server 7a (D3), the connection mediation server 10 refers to the identification information 19 added to the communication request 18, and recognizes a communication request for updating firmware at the image processing device 14a. Then, the connection mediation server 10 transmits a connection request to the relay server 12 (D5), and also, requests the relay server 12 for status information 20 about the state of the image processing device 14a (D15). In the present embodiment, the status information 20 is information about the state of the image processing device 14 according to a result of checking the state of the image processing device 14 by the relay server 12. When a request for the status information 20 about the image processing device 14a is received from the connection mediation server 10, the relay server 12 checks the state of the image processing device 14a every predetermined period of time (D17). After checking the state of the image processing device 14a, the relay server 12 generates the status information 20 according to the check result, and transmits the information to the connection mediation server 10 (D20). When the status information 20 is received from the relay server 12, the connection mediation server 10 stores the information in a storage unit. Then, when a communication request 18 specifying the image processing device 14a is received from the application server 7b (D11), the status information 20 stored in the storage unit is referred to, and a response according to the status information 20 is transmitted to the application server 7b (D13).

When checking the state of the image processing device 14a (D17), the relay server 12 checks the process that is being performed by the image processing device 14a, the current status of the process, and whether connection with another device is possible or not, for example. Then, the relay server 12 generates the status information 20 according to the check result. FIG. 3 is a conceptual diagram showing an example structure of the status information 20 according to one or more embodiments of the invention. The status information 20 includes image processing device information 20a indicating the image processing device 14 being managed by the relay server 12, processing information 20b indicating a content of processing being performed by each image processing device, and connection information 20c indicating whether connection to each image processing device is possible or not. When a request for the status information 20 is received from the connection mediation server 10, the relay server 12 checks the states of the image processing devices 14a and 14b, and generates the status information 20 as shown in the drawing. Alternatively, it is also possible to check the state of only the image processing device 14a, and to generate the status information 20 about the image processing device 14a.

The relay server 12 checks the current state of the image processing device 14, and when end of update of firmware at the image processing device 14a is detected, the relay server 12 accordingly generates the status information 20, and transmits the information to the connection mediation server 10 (D20). The connection mediation server 10 refers to the status information 20 received from the relay server 12, and when, after end of update of firmware at the image processing device 14a is recognized, a communication request 18 specifying the image processing device 14a is received from the application server 7a or 7b, the connection mediation server 10 transmits a connection request to the relay server 12 according to the received communication request 18. This is because update of firmware is ended, and the image processing device 14a is restored to a state where communication with another device is allowed. Furthermore, the connection mediation server 10 transmits, to the relay server 12, a status request cancel instruction for cancelling the request for the status information 20. When the status request cancel instruction is received, the relay server 12 ends monitoring of the image processing device 14.

Figure 4:
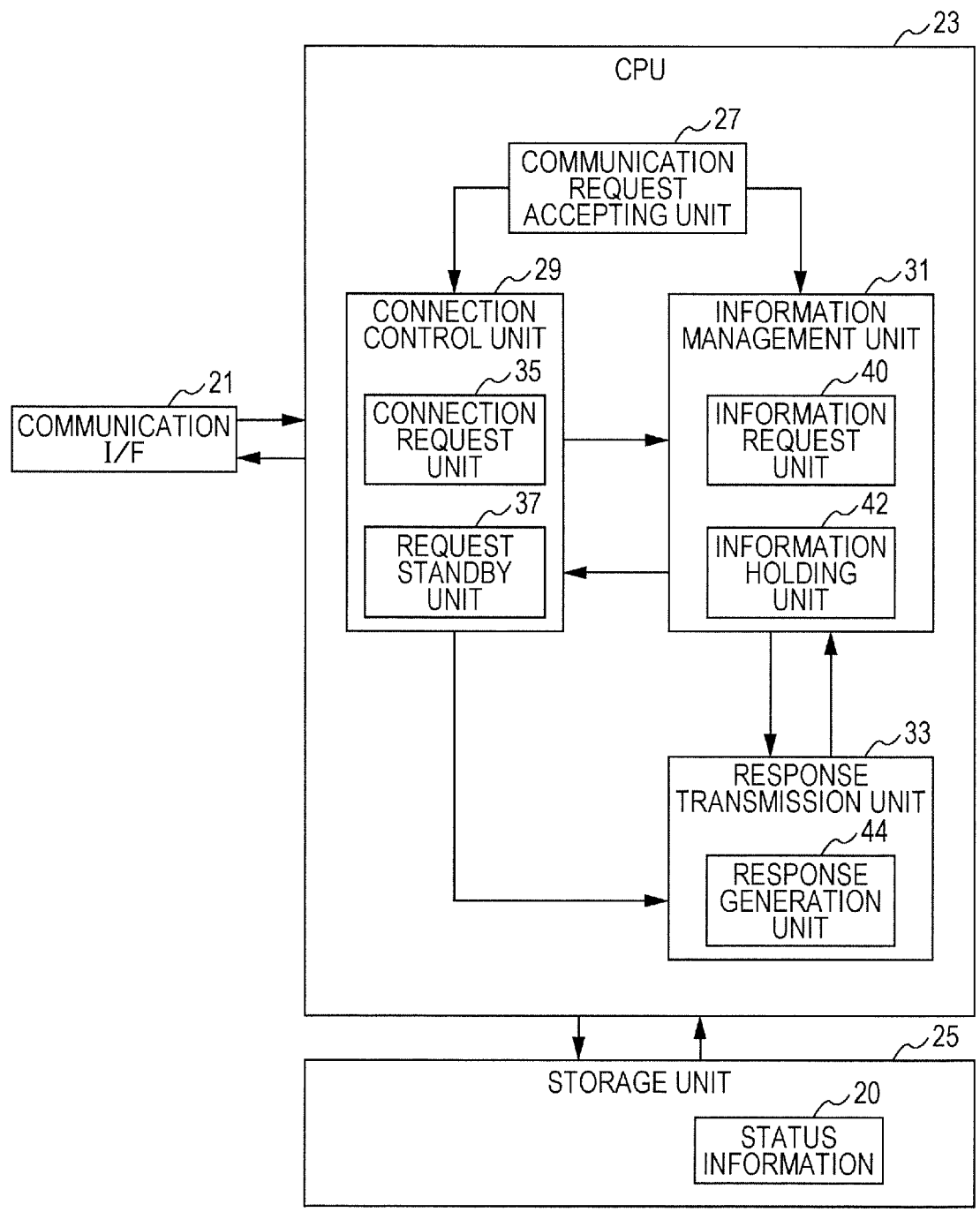
FIG. 4 is a block diagram showing an example functional configuration of the connection mediation server constituting the image processing system according to one or more embodiments of the invention.

Next, the configurations of the connection mediation server 10, the relay server 12, and the application server 7 constituting the image processing system 1 according to the present embodiment will be described. FIG. 4 is a block diagram showing an example functional configuration of the connection mediation server 10 according to one or more embodiments of the invention.

The connection mediation server 10 includes a communication interface 21 serving as an interface for communication with external devices such as the application server 7, the relay server 12 and the like, a CPU 23, and a storage unit 25 storing the status information 20. The CPU 23 functions, by execution of control programs stored in the storage unit 25, as a communication request accepting unit 27 for accepting a communication request 18 received from the application server 7, a connection control unit 29 for performing control of connecting the application server 7 and the image processing device 14, an information management unit 31 for managing the status information 20 received from the relay server 12, and a response transmission unit 33 for issuing a response in a case where a communication request is received from the application server 7.

Furthermore, the connection control unit 29 includes a connection request unit 35 for transmitting a connection request to the relay server 12, and a request standby unit 37 for causing a communication request 18 received from the application server 7 to standby. The connection request unit 35 is a processing unit for transmitting a connection request to the relay server 12 when a communication request 18 is accepted by the communication request accepting unit 27. In a case where a communication request 18 for causing the image processing device 14a to perform a predetermined process such as update of firmware is accepted by the communication request accepting unit 27, the connection request unit 35 transmits a connection request to the relay server 12 according to the communication request. Also, in a case where a new communication request specifying the image processing device 14a is accepted by the communication request accepting unit 27 while a predetermined process is being performed by the image processing device 14a, the connection request unit 35 does not transmit a connection request according to the new communication request to the relay server 12.

The communication request accepting unit 27 determines whether a communication request is a communication request 18 for causing the image processing device 14a to perform a predetermined process that is set in advance. The communication request accepting unit 27 determines whether a process is a predetermined process, based on the identification information 19 that is added to the communication request 18 received from the application server 7. The communication request accepting unit 27 refers to the identification information 19, and for example, in the case where the content of processing is update of firmware, a predetermined process is determined. Also, in the case where the content of processing is not update of firmware, the communication request accepting unit 27 determines a predetermined process if the amount of data transmitted to the image processing device 14a is equal to or greater than a predetermined value. When the communication request is determined based on the identification information 19 to be the communication request 18 for causing the image processing device 14a to perform a predetermined process, the communication request accepting unit 27 sets to on a processing flag indicating that a predetermined process is being performed at the image processing device 14a. In the present embodiment, a plurality of processing flags are provided for the image processing devices 14a, 14b, and a processing flag for the image processing device 14 that performs a predetermined process is set to on. For example, in a case where a predetermined process is to be performed at the image processing device 14a, a processing flag for the image processing device 14a is set to on. Also, in a case where a predetermined process is to be performed at the image processing device 14b, a processing flag for the image processing device 14b is set to on. When the communication request 18 for causing the image processing device 14a to perform a predetermined process is determined by the communication request accepting unit 27, and the processing flag for the image processing device 14a is set to on, the connection request unit 35 does not transmit a connection request according to a communication request 18 specifying the image processing device 14a which is received at a later time (for example, see D11 in FIG. 1) to the relay server 12. On the other hand, when the communication request is determined by the communication request accepting unit 27 to be not the communication request 18 for causing the image processing device 14a to perform a predetermined process, and the processing flag for the image processing device 14a is set to off, the connection request unit 35 transmits the connection request specifying the image processing device 14a to the relay server 12. Additionally, if a communication request 18 specifying the image processing device 14b is received from the application server 7 when the processing flag for the image processing device 14a is set to on, the connection request unit 35 transmits a connection request specifying the image processing device 14b to the relay server 12 according to the communication request 18 on the condition that the processing flag for the image processing device 14b is not set to on, and causes a connection state to be established between the relay server 12 and the application server 7.

In a case where status information 20 indicating that a predetermined process such as update of firmware is ended at the image processing device 14a is held by an information holding unit 42, described later, if a communication request 18 specifying the image processing device 14a from the application server 7a or 7b is accepted by the communication request accepting unit 27, the connection request unit 35 transmits a connection request to the relay server 12 according to the communication request 18 which has been accepted. When acceptance of the communication request 18 specifying the image processing device 14a by the communication request accepting unit 27 is detected, the connection request unit 35 refers to the status information 20 stored in the storage unit 25 by the information holding unit 42. Then, when update of firmware at the image processing device 14a is ended and the image processing device 14a is enabled connection, a connection request specifying the image processing device 14a is transmitted to the relay server 12 according to the communication request 18 accepted by the communication request accepting unit 27. Then, when a predetermined process is ended at the image processing device 14a, the connection mediation server 10 transmits the connection request to the relay server 12, and the relay server 12 establishes a connection state between the image processing device 14a and the application server 7a or 7b.

If a communication request 18 specifying the image processing device 14a is received when a predetermined process is being performed at the image processing device 14a, the connection request unit 35 may transmit a connection request for the image processing device 14b to the relay server 12 according to the communication request 18. If a new communication request 18 is accepted by the communication request accepting unit 27 when the processing flag is set to on by the communication request accepting unit 27, the connection request unit 35 refers to the status information 20 stored in the storage unit 25. In the case where the image processing device 14b is not performing a process and connection to another device is allowed, as in the example of the status information 20 shown in FIG. 3, for example, the connection request unit 35 specifies the image processing device 14b, and transmits a connection request to the relay server 12.

Additionally, the image processing device information 20a in the status information 20 includes the address of the image processing device 14 which is managed by the relay server 12, and information about the function of the image processing device 14. Furthermore, in a case where a process according to the processing content information 18b in the communication request 18 is executable by the image processing device 14b, the connection request unit 35 specifies the image processing device 14b, and transmits a connection request to the relay server 12. Also, the connection request unit 35 refers to the image processing device information 20a in the status information 20, and checks the function of the image processing device 14b. Then, the connection request unit 35 checks the content of the processing content information 18b against the function of the image processing device 14b, and if it is determined that the process according to the processing content information 18b is executable at the image processing device 14b, a connection request specifying the image processing device 14b is transmitted to the relay server 12. On the other hand, in the case where it is determined that the process according to the processing content information 18b is not executable at the image processing device 14b, the connection request unit 35 does not transmit a connection request specifying the image processing device 14b to the relay server 12.

As described above, when a new communication request 18 specifying the image processing device 14a is received in a state where a predetermined process is being performed at the image processing device 14a, if the processing content read from the communication request 18 is executable at the image processing device 14b, the image processing device 14b is made to perform execution instead of the image processing device 14a, and a job or the like according to the new communication request 18 may be swiftly performed.

Referring again to FIG. 4, the request standby unit 37 is a processing unit for causing a communication request 18 specifying the image processing device 14a to standby in a case where a connection request according to the communication request 18 is not transmitted by the connection request unit 35. When the communication request 18 specifying the image processing device 14a is accepted by the communication request accepting unit 27 in a state where the processing flag for the image processing device 14a is set to on, the connection request unit 35 does not transmit a connection request according to the communication request 18. In a case where the processing flag for the image processing device 14a is set to on, the request standby unit 37 causes the communication request 18 accepted by the communication request accepting unit 27 to standby in the order of acceptance.

Then, in a case where status information 20 indicating that a predetermined process is ended at the image processing device 14a is received from the relay server 12, the connection request unit 35 transmits a connection request to the relay server 12 according to the communication request 18 placed in standby by the request standby unit 37. If status information 20 is received from the relay server 12 while the communication request 18 is placed in standby by the request standby unit 37, the connection request unit 35 refers to the received status information 20. Then, if the status information 20 indicates that the image processing device 14a has ended a predetermined process and that connection is allowed, the connection request unit 35 transmits a connection request specifying the image processing device 14a to the relay server 12 according to the communication request 18, for the image processing device 14a, which is in standby. In this manner, by placing a new communication request 18 specifying the image processing device 14a received in a state where a predetermined process is being performed at the image processing device 14a in standby until the predetermined process is ended, a process according to the new communication request 18 is appropriately performed after the predetermined process is ended. Accordingly, it is possible to eliminate the burden of having to re-transmit the new communication request 18 specifying the image processing device 14a from the application server 7 to the connection mediation server 10 in a case where a predetermined process is being performed at the image processing device 14a.

The information management unit 31 further includes the information holding unit 42 for holding the status information 20 received from the relay server 12. The information holding unit 42 is a processing unit that holds received status information 20 when the status information 20 is received from the relay server 12. When status information 20 is received from the relay server 12, if status information 20 is already stored in the storage unit 25, the information holding unit 42 replaces the status information 20 with the received status information 20. This allows the connection mediation server 10 to hold the latest status information 20. Also, the information management unit 31 further includes an information request unit 40 (FIG. 1). In a case where a communication request 18 for the image processing device 14a accepted by the communication request accepting unit 27 is determined to be a communication request 18 for execution of a predetermined process, the information request unit 40 requests the relay server 12 for the status information 20 of the image processing device 14a. Alternatively, the information request unit 40 requests the relay server 12 for the status information 20 of all the image processing devices 14 that are managed by the relay server 12, including the image processing device 14a.

The response transmission unit 33 further includes a response generation unit 44 for generating a response to the application server 7b. The response transmission unit 33 is a processing unit for referring to the status information 20 held by the information holding unit 42 in a case where a connection request according to a communication request 18 specifying the image processing device 14a is not transmitted from the connection request unit 35 to the relay server 12, and for transmitting a response according to the status information 20 to the application server 7b with respect to the connection request. When a communication request 18, specifying the image processing device 14a, received from the application server 7b is accepted by the communication request accepting unit 27 in a case where the processing flag of the image processing device 14a is set to on according to a communication request 18 received from the application server 7a, the connection request unit 35 does not transmit, to the relay server 12, a connection request according to the communication request 18 received from the application server 7b. In this case, the response generation unit 44 refers to the status information 20, and generates a response to the effect that the image processing device 14a is updating firmware, for example, and the response transmission unit 33 transmits the response to the application server 7b which transmitted the communication request 18. The application server 7b thereby recognizes that a connection request according to the communication request 18 is not transmitted to the relay server. Accordingly, the application server 7b may notify the user that connection to the image processing device 14a is not possible, without waiting for transmission of a connection start request from the relay server 12.

The response transmission unit 33 may add to the response information about time that is required until the end of a predetermined process, and transmit the response to the application server 7b. For example, the response transmission unit 33 holds in advance standard processing time information (not shown) in which the amount of data to be transmitted to the image processing device 14 and the standard processing time at the image processing device 14 are associated. The response transmission unit 33 refers to the data amount information 18c in the communication request 18, adds the time information about the standard processing time corresponding to the amount of data to the response, and transmits the response to the application server 7b. A user who wants the image processing device 14 to perform a process through the application server 7b may know the estimated time until execution of a process becomes possible at the image processing device 14.

Figure 5:
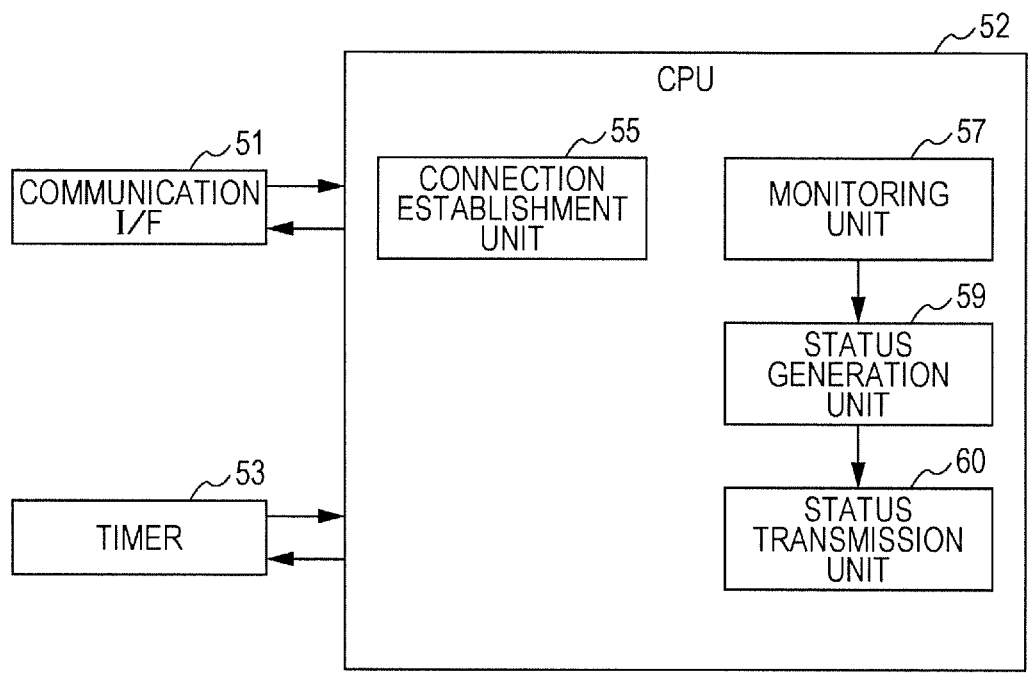
FIG. 5 is a block diagram showing an example functional configuration of a relay server constituting the image processing system according to one or more embodiments of the invention.

FIG. 5 is a block diagram showing an example functional configuration of the relay server 12 according to one or more embodiments of the invention. The relay server 12 includes a communication interface 51 serving as an interface for communication with external devices such as the connection mediation server 10 and the image processing device 14, a CPU 52, and a timer 53 for counting a predetermined period of time. The CPU 52 functions, by execution of control programs in the relay server 12, a connection establishment unit 55 for establishing a connection state to the application server 7, a monitoring unit 57 for regularly monitoring the state of the image processing device 14, a status generation unit 59 for generating status information 20 according to the state of the image processing device 14 detected by the monitoring unit 57, and a status transmission unit 60 for transmitting the status information 20 to the connection mediation server 10.

The connection establishment unit 55 is a processing unit for establishing a connection state to the application server 7 specified by a connection request when a connection request is received from the connection mediation server 10. In the present embodiment, the connection establishment unit 55 transmits a connection start request based on the address of the application server 7a included in the connection request, and establishes a connection state between the application server 7a and the relay server 12. In a state where a connection state is established between the application server 7a and the relay server 12, the application server 7a and the image processing device 14a are allowed to communicate over HTTP, for example. Alternatively, the connection establishment unit 55 may send an instruction to the image processing device 14a specified by the connection request to transmit a connection start request to the application server 7a, and the connection start request may be transmitted from the image processing device 14a receiving the instruction to the application server 7a.

The monitoring unit 57 is a processing unit for regularly monitoring the states of the image processing devices 14a and 14b managed by the relay server 12. In the present embodiment, when a status request is received from the connection mediation server 10, the monitoring unit 57 performs communication with the image processing device 14a and 14b every predetermined period of time to check their states. For example, the image processing devices 14a and 14b are inquired about the contents of processes being performed and the progress statuses, and responses are received from the image processing devices 14a, 14b. The monitoring unit 57 may monitor all the image processing devices 14a, 14b that are managed by the relay server 12, or may monitor only the image processing device 14a that is specified by a connection request received from the connection mediation server 10. Alternatively, the monitoring unit 57 may start monitoring of the image processing devices 14a and 14b managed by the relay server 12 under the condition that a connection state is established between the application server 7 and an image processing device 14, instead of the status request from the connection mediation server 10.

When the status request is received from the connection mediation server 10, the monitoring unit 57 sets a monitor flag to on. Then, when the timer 53 has counted the predetermined period of time, communication with the image processing devices 14a, 14b is performed to check their states. Then, when a status request cancel instruction is received from the connection mediation server 10, the monitoring unit 57 sets the monitor flag to off, and ends monitoring of the image processing devices 14a, 14b.

The status generation unit 59 generates status information 20 according to the state of the image processing device 14a, 14b detected by the monitoring unit 57. In this case, for example, if the monitoring unit 57 was not able to communicate with the image processing device 14a, the status generation unit 59 generates the status information 20 indicating that connection to the image processing device 14a is not possible. The status transmission unit 60 transmits the status information 20 according to the state of the image processing device 14a, 14b detected by the monitoring unit 57 to the connection mediation server 10. Moreover, the status transmission unit 60 may transmit the status information 20 to the connection mediation server 10 when a change in the state of the image processing device 14a, 14b is detected by the monitoring unit 57. In this case, if when the monitoring unit 57 performs communication with the image processing device 14a, 14b, it is detected that the current state of the image processing device 14a, 14b is changed from the state at the time of previous communication, the status transmission unit 60 transmits the status information 20 to the connection mediation server 10. On the other hand, if the current state of the image processing device 14a, 14b is not changed from the state at the time of previous communication, the status transmission unit 60 does not transmit the status information 20. In this manner, the status information 20 is transmitted to the connection mediation server 10 only when there is a change in the state of the image processing device 14a, 14b, and the status information 20 stored in the connection mediation server 10 is updated. Alternatively, the status transmission unit 60 may detect a difference between the status information 20 that was generated based on the previous communication by the monitoring unit 57 and the status information 20 that is generated based on the current communication, and may transmit newly generated status information 20 to the connection mediation server 10 when a difference is detected. Because the status information 20 is transmitted from the relay server 12 to the connection mediation server 10 only when there is a change in the state of the image processing device 14a, 14b, the processing load regarding transmission of the status information 20 may be reduced.

Figure 6:
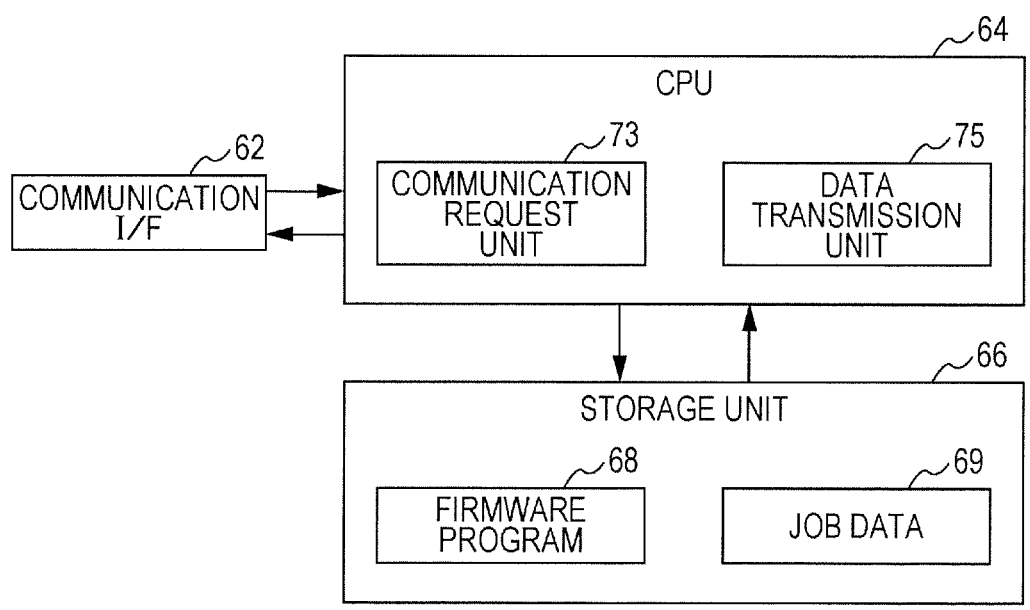
FIG. 6 is a block diagram showing an example functional configuration of the application server constituting the image processing system according to one or more embodiments of the invention.

FIG. 6 is a block diagram showing an example functional configuration of the application server 7 according to one or more embodiments of the invention. The application server 7 includes a communication interface 62 serving as an interface for communication with external devices such as the connection mediation server 10 and the image processing device 14, a CPU 64, and a non-volatile storage unit 66, such as an HDD. A firmware program 68 for updating firmware of the image processing device 14, and job data 69 about a print job or the like to be performed by the image processing device 14 are stored in the storage unit 66. Additionally, the application server 7a that causes the image processing device 14a to execute update of firmware stores the firmware program 68 in the storage unit 66. For its part, the application server 7b that causes the image processing device 14a to execute a job stores the job data 69 in the storage unit 66.

The CPU 64 includes a communication request unit 73 for generating, and transmitting, a communication request 18 for the connection mediation server 10, and a data transmission unit 75 for transmitting data to the connected image processing device 14 when a connection state to the image processing device 14 is established. In a case where the firmware program 68 or the job data 69 to be executed by the image processing device 14 is stored in the storage unit 66 by an administrator or a user of the image processing device 14, the communication request unit 73 generates a communication request 18 specifying the image processing device according to the instruction from the administrator or the user. The communication request unit 73 adds the identification information 19 allowing identification of a process to be performed by the image processing device 14 to the communication request 18, and transmits the same to the connection mediation server 10. For example, in the case of update of firmware of the image processing device 14a, the communication request unit 73 generates a communication request 18 specifying the image processing device 14a. Then, the processing content information 18b indicating update of firmware, and the data amount information 18c regarding the firmware program 68 to be transmitted to the image processing device 14a are added to the communication request 18. Also, in the case of causing the image processing device 14a to execute a print job, for example, the communication request unit 73 adds, to the communication request 18, the processing content information 18b indicating a print job, and the data amount information 18c regarding the job data 69 including document data which is the print target.

When a connection state between the relay server 12 and the application server 7 is established according to a connection start request received from the relay server 12, the data transmission unit 75 transmits the data stored in the storage unit 66 to the image processing device 14.

Figure 7:
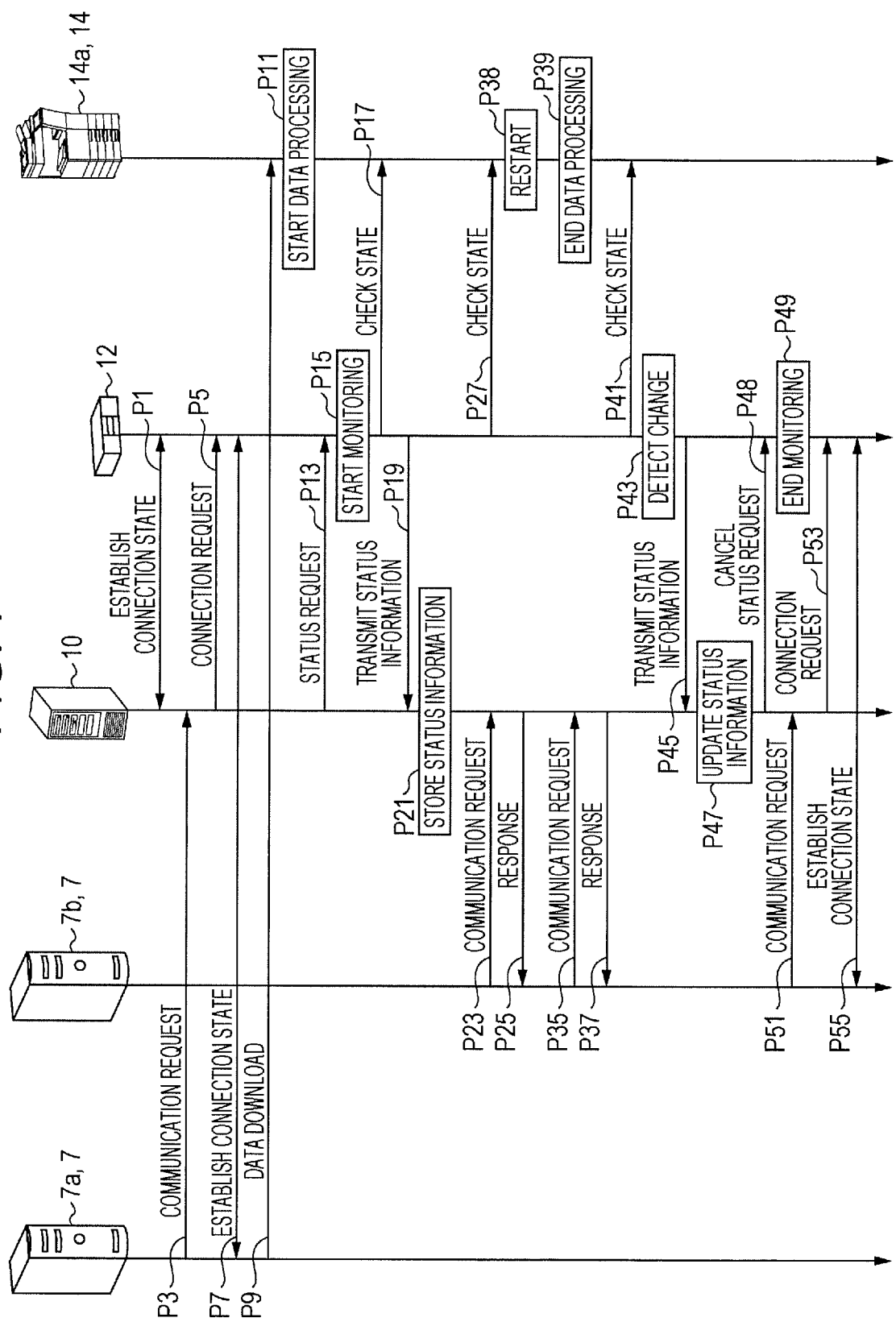
FIG. 7 is a timing chart showing an example of communication by the image processing system according to one or more embodiments of the invention.

Next, an example of a process by the image processing system 1 of the present embodiment will be described. FIG. 7 is a timing chart showing an example of a process by the image processing system 1 according to one or more embodiments of the invention. First, when activated by application of power, the relay server 12 establishes a regular connection state to the connection mediation server 10 (process P1). When a communication request 18 specifying the image processing device 14a is transmitted from the application server 7a to the connection mediation server 10 in a state where the regular connection state is established between the connection mediation server 10 and the relay server 12 (process P3), the connection mediation server 10, which received the communication request, transmits a connection request specifying the image processing device 14a to the relay server 12 (process P5). The relay server 12 establishes a connection state to the application server 7a according to the connection request received from the connection mediation server 10 (process P7). When the connection state is established, the application server 7a downloads data to the image processing device 14a (process P9). In this case, the firmware program 68 for updating firmware of the image processing device 14a is transmitted to the image processing device 14a. Then, when the firmware program 68 is received, the image processing device 14a starts data processing (process P11). Specifically, the downloaded firmware program 68 is read and installed in the image processing device 14a.

Furthermore, when the communication request 18 received from the application server 7a is determined to be for update of firmware based on the identification information 19 added to the communication request 18, the connection mediation server 10 sets the processing flag to on, and requests the relay server 12 for the status information 20 for the image processing devices 14a, 14b (process P13). When the status request is received, the relay server 12 sets the monitor flag to on, and starts monitoring of the image processing device 14 under its management (process P15). Then, the relay server 12 performs communication with the image processing device 14a to check the state of the image processing device 14a (process P17). The relay server 12 generates the status information 20 based on the communication result, and transmits the generated status information 20 to the connection mediation server 10 (process P19). When the status information 20 is received from the relay server 12, the connection mediation server 10 stores the information (process P21). When a communication request 18 specifying the image processing device 14a is received from the application server 7b (process P23), the connection mediation server 10 generates a response according to the status information 20 that is stored, and transmits the response to the application server 7b (process P25).

The relay server 12 checks the state of the image processing device 14a, 14b every time the timer 53 counts a predetermined period of time (process P27). The previously checked state of the image processing device 14a indicated firmware being updated, and the currently checked state also indicates firmware being updated. Accordingly, because there is no change in the state of the image processing device 14a, the relay server 12 does not transmit the status information 20 to the connection mediation server 10. Alternatively, the relay server 12 may transmit the status information 20 to the connection mediation server 10 even if there is no change.

When a communication request 18 specifying the image processing device 14a is received from the application server 7b (process P35), because the processing flag is set to on, the connection mediation server 10 does not transmit a connection request according to the received communication request 18 to the relay server 12. The connection mediation server 10 generates a response according to the status information 20 stored in the storage unit 25, and transmits the response to the application server 7b (process P37). When update of firmware is ended (process P39), the image processing device 14a is placed in a state where connection is allowed. When the timer 53 counts the predetermined period of time, the relay server 12 checks the state of the image processing device 14a (process P41). Although the previously checked state of the image processing device 14a indicated firmware being updated, the currently checked state of the image processing device 14a indicates end of update of firmware, and thus, the relay server 12 detects that the state of the image processing device 14a has changed (process P43). Accordingly, the relay server 12 transmits status information 20 to the connection mediation server 10 (process P45). The connection mediation server 10 updates the status information 20 stored in the storage unit 25 (process P47). Also, the connection mediation server 10 refers to the status information 20, and upon recognizing that the update of firmware has ended at the image processing device 14a, transmits a status request cancel instruction to the relay server 12 (process P48). When the status request cancel instruction is received, the relay server 12 sets the monitor flag to off, and ends monitoring (process P49). Lastly, when a communication request 18 specifying the image processing device 14a is received from the application server 7b (process P51), the connection mediation server 10 transmits a connection request to the relay server 12 (process P53). When the connection request is received from the connection mediation server 10, the relay server 12 establishes a connection state to the application server 7b (process P55).

Figure 8:
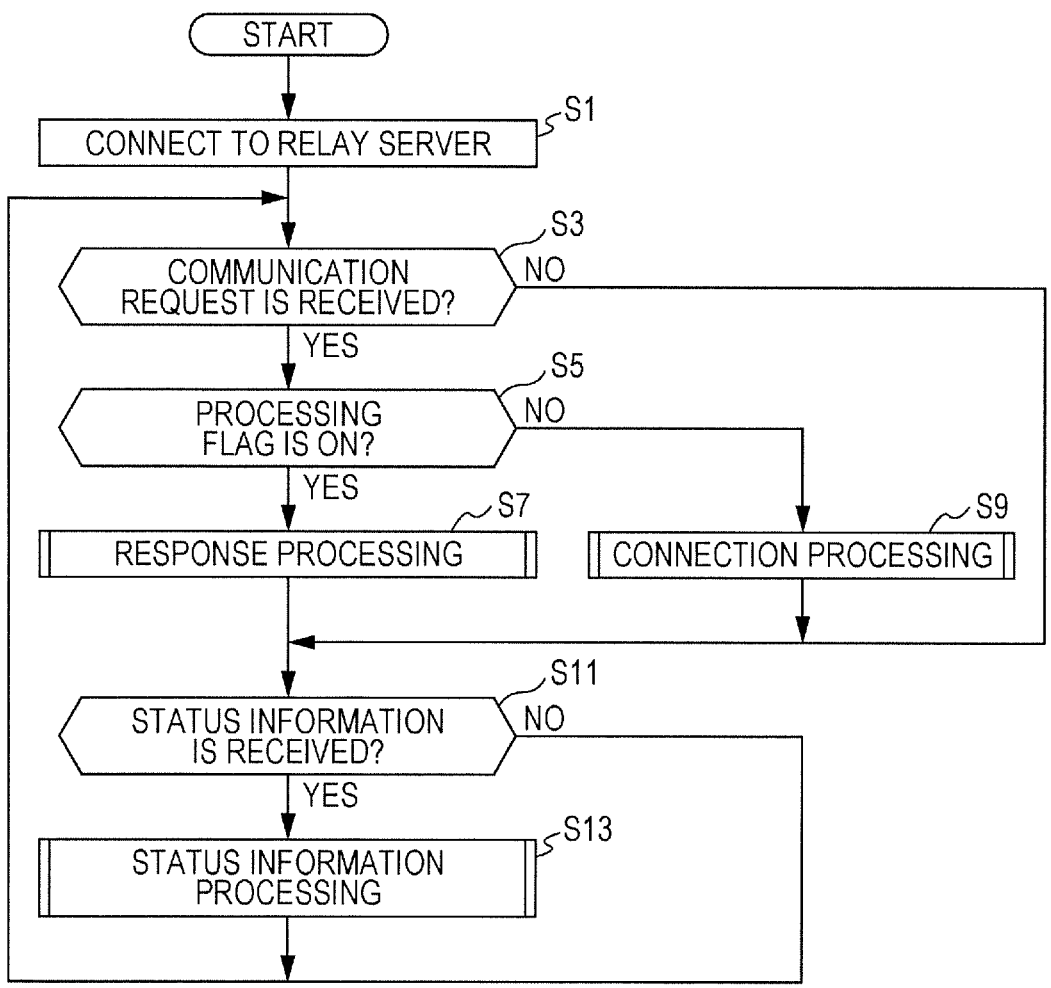
FIG. 8 is a flow chart showing an example of a main processing procedure to be performed by the connection mediation server according to one or more embodiments of the invention.

Next, examples of processing procedures of the connection mediation server 10, the relay server 12, and the application server 7 constituting the image processing system 1 will be described. FIG. 8 is a flow chart showing an example of a main processing procedure performed by the connection mediation server 10 according to one or more embodiments of the invention. When activated by application of power, the connection mediation server 10 establishes a regular connection state to the relay server 12 according to a connection request from the relay server 12 (step S1). Next, whether a communication request 18 is received from the application server 7 is determined (step S3), and when it is determined that a communication request 18 is received (YES in step S3), the connection mediation server 10 determines whether the processing flag for the image processing device 14 specified by the communication request 18 is set to on (step S5). In the case where it is determined that the processing flag is on (YES in step S5), the connection mediation server 10 performs response processing for replying to the application server 7 that a predetermined process is being performed at the image processing device 14 (step S7), without transmitting a connection request to the relay server 12. Details of the processing procedure of the response processing will be given later.

On the other hand, in the case where the processing flag for the image processing device 14 specified by the communication request 18 is determined to be off (NO in step S5), the connection mediation server 10 performs connection processing of transmitting a connection request specifying the image processing device 14 to the relay server 12 according to the communication request 18 (step S9). Details of the processing procedure of the connection processing will be given later. In the case where it is determined in step S3 that a communication request 18 is not received (NO in step S3), the connection mediation server 10 skips processes from step S5 to S9.

Furthermore, the connection mediation server 10 determines whether the status information 20 is received from the relay server 12 (step S11), and in the case where reception of the status information 20 is determined (YES in step S11), status information processing (step S13) for acquiring the status information 20 is performed. Details of the processing procedure of the status information processing will be given later. On the other hand, in the case where it is determined that the status information 20 is not received (NO in step S11), the status information processing in step S13 is skipped. After the processes described above have been performed, the connection mediation server 10 returns to process P53, and repeats the subsequent processes.

Figure 9:
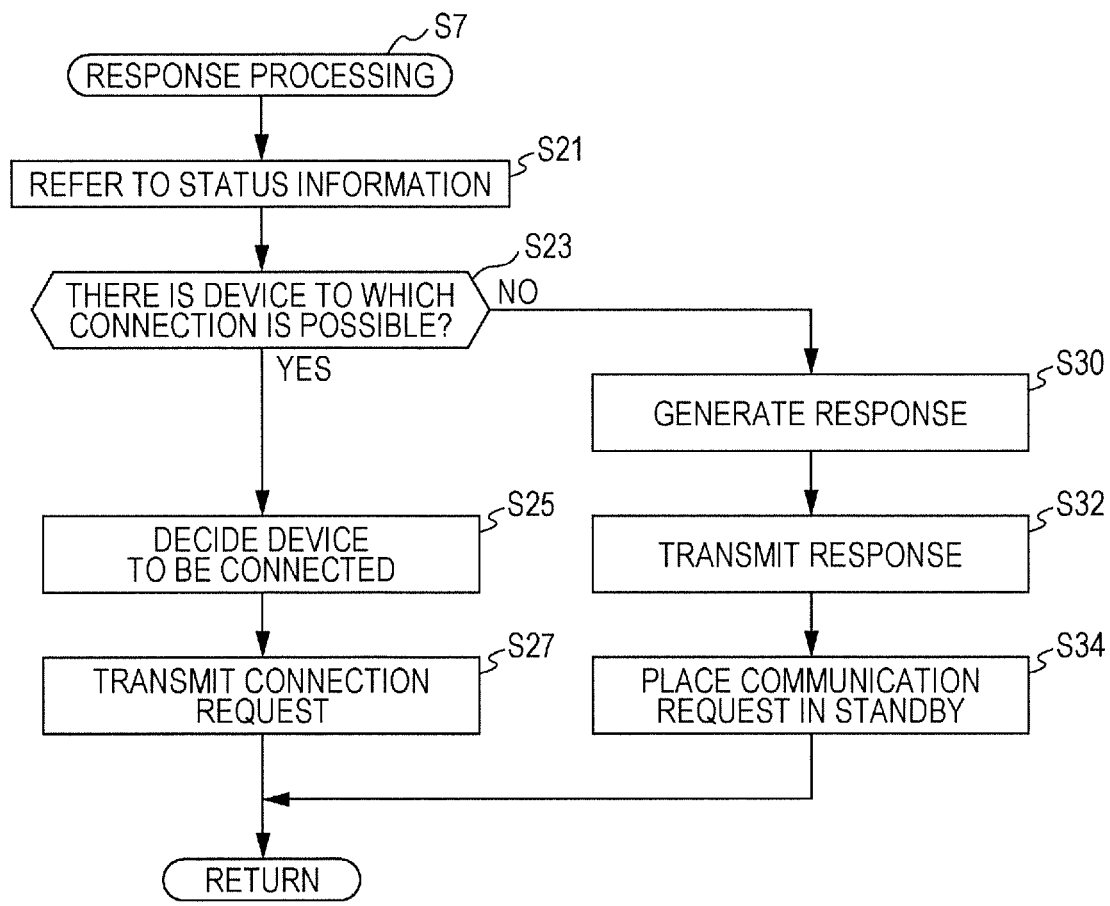
FIG. 9 is a flow chart showing an example of a specific processing procedure of response processing according to one or more embodiments of the invention.

FIG. 9 is a flow chart showing an example of a specific processing procedure of the response processing according to one or more embodiments of the invention (step S7 in FIG. 8). The connection mediation server 10 refers to the status information 20 (step S21). Next, the connection mediation server 10 determines whether there is, among the image processing devices 14 managed by the relay server 12, an image processing device 14 which is different from the image processing device 14 specified by the communication request 18 and which is allowed to perform connection (step S23). For example, the connection mediation server 10 extracts image processing devices 14 which are allowed to connect to another device. An image processing device 14 whose firmware is being updated is considered to be not allowed connection. Next, it is determined whether there is an image processing device 14 which is capable of executing a process according to the communication request 18 in the extracted image processing devices 14. Then, when it is determined that there is an image processing device 14 which is allowed connection (YES in step S23), the image processing device 14 which is to connect to the application server 7 is decided (step S25). When the image processing device 14 to be connected to the application server 7 is decided, the connection mediation server 10 specifies the decided image processing device 14 and transmits a connection request to the relay server 12 (step S27), and ends the response processing.

On the other hand, in the case where it is determined that there is no image processing device 14 which is different from the image processing device 14 specified by the communication request 18 and which is allowed to perform connection (NO in step S23), the connection mediation server 10 generates a response according to the status information 20 (step S30), and transmits the response to the application server 7 which transmitted the communication request 18 (step S32). The connection mediation server 10 may alternatively transmit a response to which processing time information indicating the time required until a predetermined process is ended at the image processing device 14 is added. Moreover, the communication request 18 is placed in standby (step S34). Additionally, unlike the example shown in the drawing, the communication request 18 may be discarded instead of being placed in standby.

Figure 10:
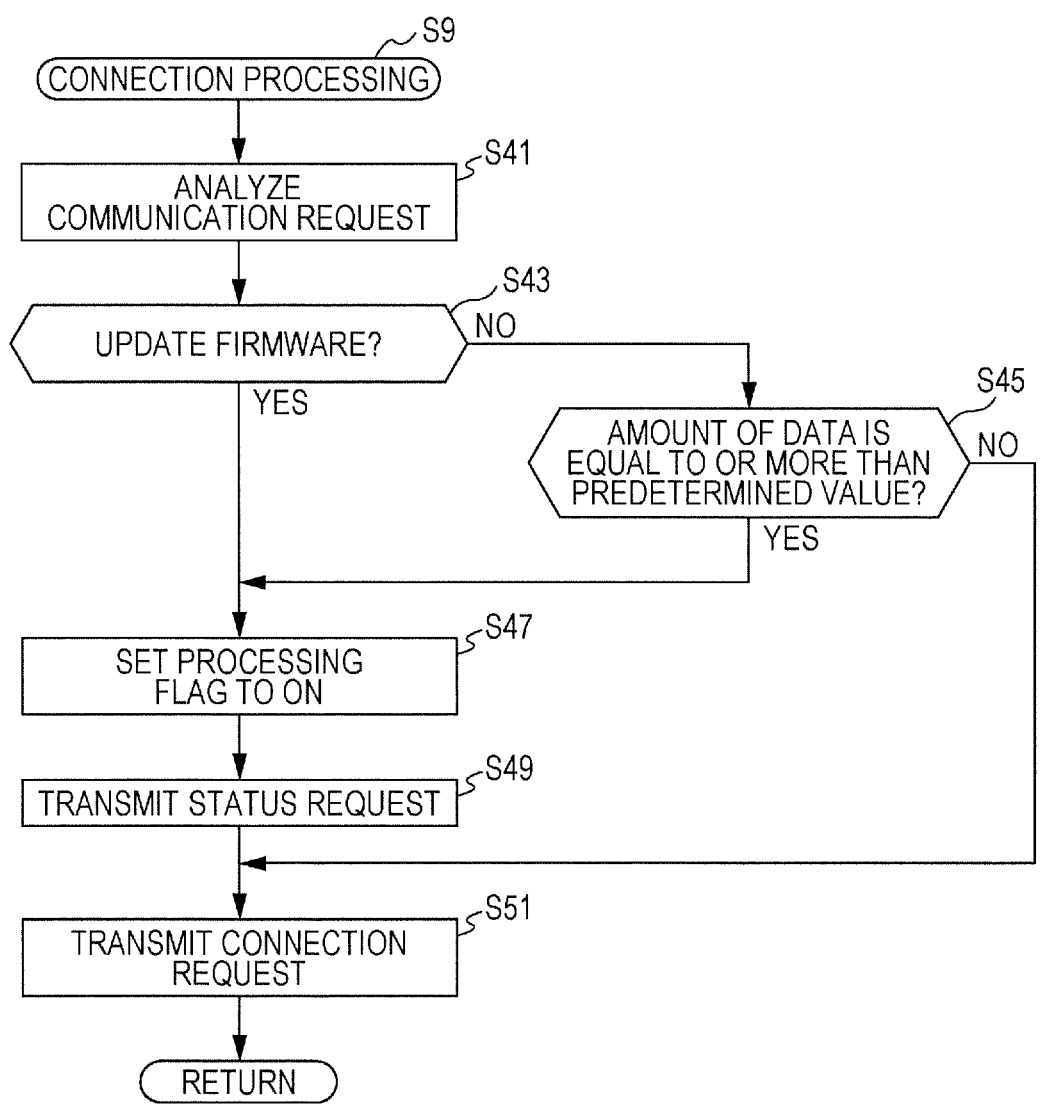
FIG. 10 is a flow chart showing an example of a specific processing procedure of connection processing according to one or more embodiments of the invention.

FIG. 10 is a flow chart showing an example of a specific processing procedure of the connection processing according to one or more embodiments of the invention (step S9 in FIG. 8). The connection mediation server 10 analyzes the communication request 18 received from the application server 7 (step S41), and reads the identification information 19. Then, it is determined whether the processing content read from the identification information 19 is update of firmware or not (step S43), for example. In the case where other than update of firmware is determined (NO in step S43), the connection mediation server 10 further determines whether or not the data amount information 18c included in the identification information 19 is equal to or more than a predetermined value (step S45). In the case where it is determined that the processing content is update of firmware (YES in step S43), or that the data amount information 18c is equal to or more than the predetermined value (YES in step S45), the connection mediation server 10 sets the processing flag for the image processing device 14 specified by the communication request 18 to on (step S47). Then, a status request is transmitted to the relay server 12 (step S49), and also, a connection request according to the communication request 18 is transmitted (step S51), and the connection processing is ended. On the other hand, if it is NO in both steps S43 and S45, steps S47 and S49 are skipped, and the connection processing is ended by transmitting a connection request to the relay server 12, without transmitting the status request. In the case where the processing content read from the identification information 19 is update of firmware, the image processing device 14 is placed in a state where communication with other devices is not allowed for a certain period of time during the update processing. Also, in the case where the data amount information 18c included in the identification information 19 is equal to or more than the predetermined value, the performance of the image processing device 14 may be reduced, and in a state where the performance is reduced, communication with other devices may become difficult, such as by being delayed. Accordingly, when the communication request 18 is determined to be for causing the image processing device 14 to perform the processing described above, the connection mediation server 10 sets the processing flag for the image processing device 14 specified by the communication request 18 to on. This prevents transmission, to the relay server 12, of a new communication request 18 for the image processing device 14 whose processing flag is set to on, and a useless connection state is not established according to the new communication request 18.

Figure 11:
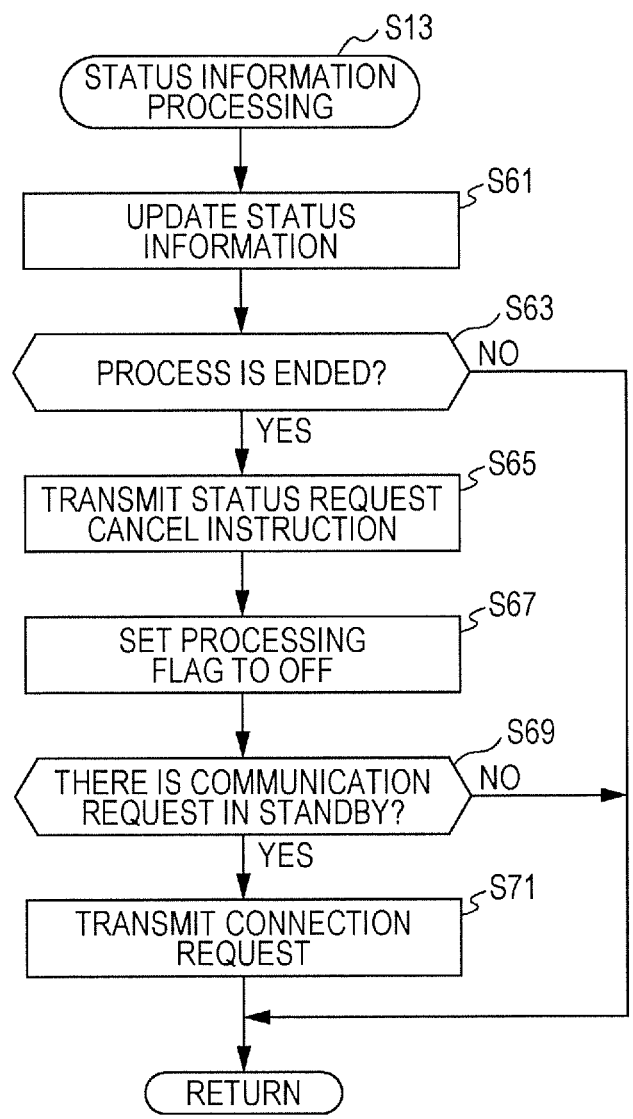
FIG. 11 is a flow chart showing an example of a specific processing procedure of status information processing according to one or more embodiments of the invention.

FIG. 11 is a flow chart showing an example of a specific processing procedure of the status information processing according to one or more embodiments of the invention (step S13 in FIG. 8). When status information 20 is received from the relay server 12, the connection mediation server 10 updates the status information 20 that is stored in the storage unit 25. Next, the updated status information 20 is referred to, and whether or not a predetermined process is ended at the image processing device 14 is determined (step S63). In the case where it is determined that a predetermined process is ended (YES in step S63), a status request cancel instruction is transmitted to the relay server 12 (step S65). Additionally, in the case where the relay server 12 is monitoring all the image processing devices 14 that are managed by the relay server 12, if a predetermined process is being performed by an image processing device 14, among the image processing devices 14, different from the image processing device 14 in question, the connection mediation server 10 does not transmit the status request cancel instruction to the relay server 12.

When the status request cancel instruction is transmitted in step S65, the processing flag is set to off (step S67). Next, whether there is a communication request 18 in standby which specifies the image processing device 14 in question is determined (step S69), and if it is determined that there is a communication request 18 in standby (YES in step S69), the connection mediation server 10 transmits a connection request specifying the image processing device 14 in question to the relay server 12 (step S71), and ends the status information processing. On the other hand, in the case where it is determined that a predetermined process is not ended at the image processing device 14 (NO in step S63), processes from steps S65 to S71 are skipped.

Figure 12:
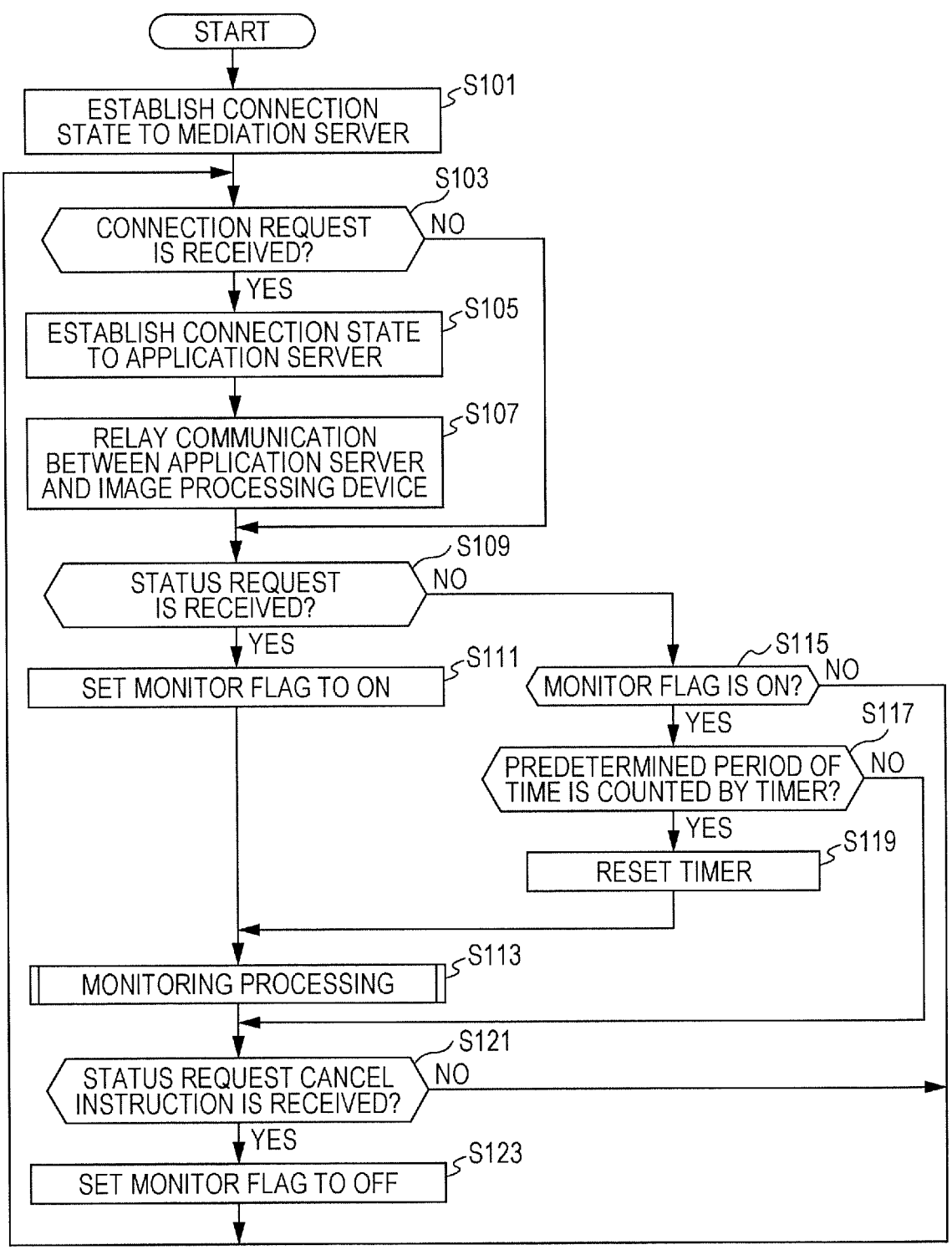
FIG. 12 is a flow chart showing an example of a main processing procedure to be performed by the relay server according to one or more embodiments of the invention.

Next, an example of a processing procedure of the relay server 12 will be described. FIG. 12 is a flow chart showing an example of a main processing procedure to be performed by the relay server 12 according to one or more embodiments of the invention. When activated by application of power, the relay server 12 performs a connection request to the connection mediation server 10, and establishes a regular connection state to the connection mediation server 10 (step S101). Next, whether a connection request is received from the connection mediation server 10 is determined (step S103), and if it is determined that a connection request is received (YES in step S103), a connection start request is transmitted to the application server 7 at the address included in the connection request, for example, and a connection state is established (step S105). Then, after the connection state to the application server 7 is established, data is transmitted from the application server 7 to the image processing device 14. The relay server 12 relays communication between the application server 7 and the image processing device 14 (step S107). On the other hand, if it is determined that a connection request is not received (NO in step S103), the relay server 12 skips steps S105 and S107.

Furthermore, the relay server 12 determines whether a status request is received from the connection mediation server 10 (step S109), and if it is determined that a status request is received (YES in step S109), the monitor flag is set to on (step S111), and monitoring processing of regularly monitoring the state of the image processing device 14 under the management of the relay server 12 is performed (step S113). Details of the processing procedure of the monitoring processing will be given later. Additionally, unlike in the example shown in the drawing, the monitor flag may be set to on and the monitoring processing may be started regardless of whether a status request is received from the connection mediation server 10 or not. For example, after establishing a connection state to the application server 7, the relay server 12 may start the monitoring processing for the state of the image processing device 14 under its management. In this case, the process in step S109 for determining whether a status request is received or not is unnecessary.

If it is determined in step S109 that a status request is not received (NO in step S109), whether the monitor flag is set to on is determined (step S115). If it is determined that the monitor flag is on (YES in step S115), the relay server 12 determines whether a predetermined period of time is counted by the timer 53 (step S117). Then, in the case where it is determined that the timer has counted the predetermined period of time (YES in step S117), the timer 53 is reset (step S119), and then, the monitoring processing is performed (step S113). On the other hand, if it is determined in step S115 that the monitor flag is off (NO in step S115), or if it is determined that the timer has not counted up to the predetermined period of time (NO in step S117), the monitoring processing is skipped.

Lastly, the relay server 12 determines whether a status request cancel instruction is received from the connection mediation server 10 (step S121), and if reception is determined (YES in step S121), the monitor flag is set to off (step S123), and the processes are repeated from step S103. If it is determined in step S121 that a status request cancel instruction is not received (NO in step S121), step S123 is skipped. Additionally, unlike in the example shown in the drawing, the relay server 12 may set the monitor flag to off and end the monitoring processing regardless of whether a status request cancel instruction is received from the connection mediation server 10 or not. For example, the relay server 12 sets the monitor flag to off and ends the monitoring processing when the connection state established between the application server 7 and the relay server 12 is ended.

Figure 13:
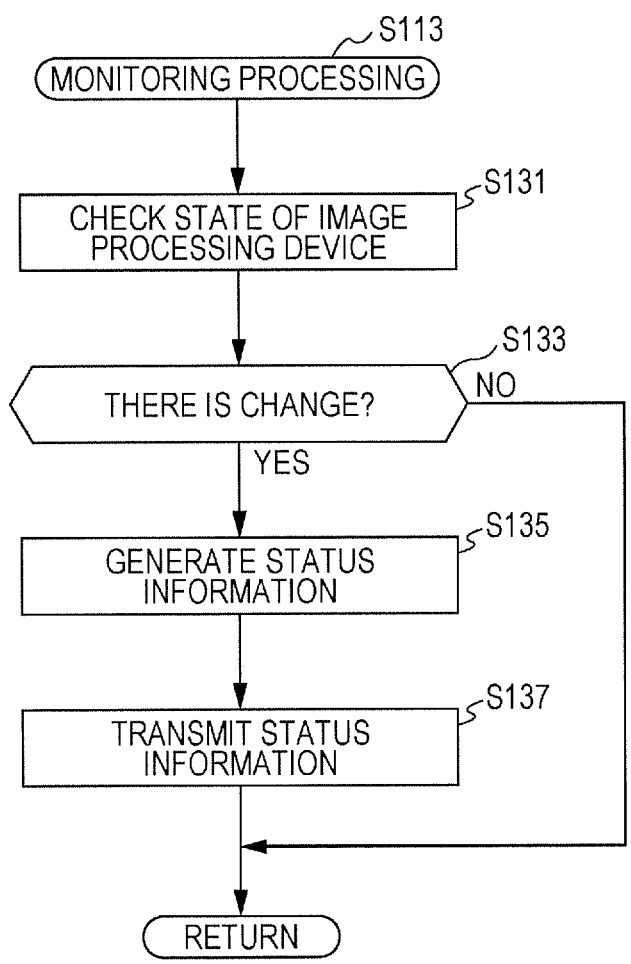
FIG. 13 is a flow chart showing an example of a specific processing procedure of monitoring processing according to one or more embodiments of the invention.
Figure 14:
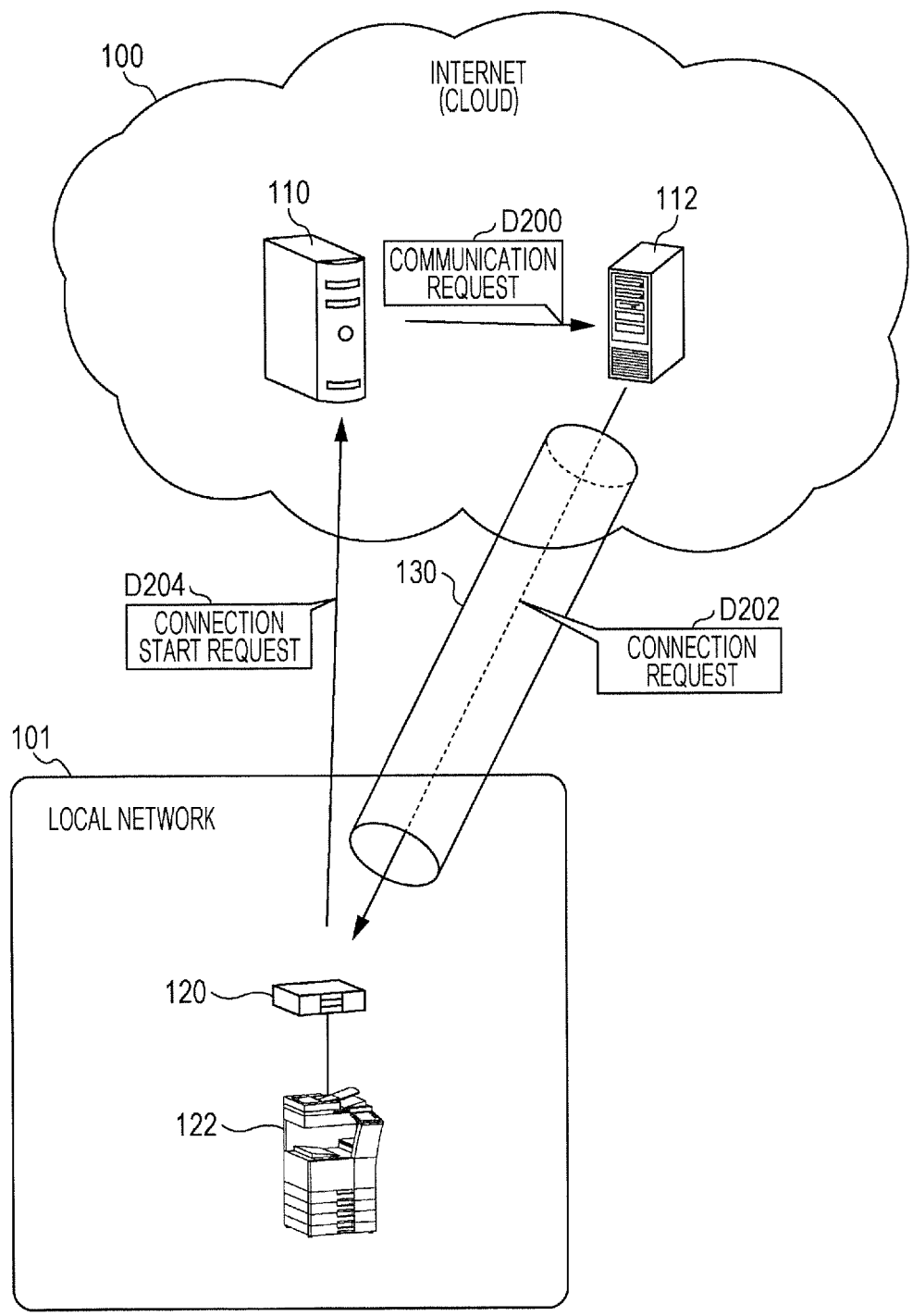
FIG. 14 is a diagram showing an example of a conventional image processing system.

FIG. 13 is a flow chart showing an example of a specific processing procedure of the monitoring processing according to one or more embodiments of the invention (step S113 in FIG. 12). In a state where the monitor flag is on, the relay server 12 checks the state of the image processing device 14 under its management (step S131). Then, whether the currently checked state of the image processing device 14 is changed from the previously checked state of the image processing device 14 is determined (step S133). If it is determined that there is a change from the previously checked state of the image processing device 14 (YES in step S133), the relay server 12 generates the status information 20 according to the currently checked state of the image processing device 14 (step S135). Then, the generated status information 20 is transmitted to the connection mediation server 10 (step S137), and the monitoring processing is ended. On the other hand, if the currently checked state of the image processing device 14 is determined to be the same as the previously checked state of the image processing device 14 (NO in step S133), steps S135 and S137 are skipped, and the status information 20 is not transmitted to the connection mediation server 10. Additionally, unlike in the example shown in the drawing, the status information 20 may be transmitted to the connection mediation server 10 every time the state of the image processing device 14 is checked, regardless of whether there is a change in the state of the image processing device 14 or not.

Example Modification

Various embodiments of the present invention have been described above, but the present invention is not limited to the contents described in the embodiments, and various example modifications may be applied.

In the embodiments described above, an example is shown where the response transmission unit 33 transmits standard processing time that is required for a predetermined process to the application server 7 by adding the information to a response. However, the present invention is not limited to such an example, and the following example modification may also be applied. When a connection state is established between the application server 7a and the image processing device 14a by the connection establishment unit 55, the relay server 12 acquires information about communication speed in the connection state, and transmits the information to the connection mediation server 10. Then, the connection mediation server 10 calculates the processing time required for a predetermined process at the image processing device 14a, by using the data amount information 18c in the communication request 18 received from the application server 7a, the communication speed information received from the relay server 12, and the image processing device information 20a in the status information 20. The response transmission unit 33 transmits a response in which the time until a predetermined process is ended, based on the calculated processing time, is added in response to the communication request 18 specifying the image processing device 14a from the application server 7b. A user who transmitted the communication request 18 from the application server 7b is thereby allowed to grasp the accurate time from end of a predetermined process to transmission, to the relay server 12, of a connection request according to the communication request.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing system comprising:
an application server installed on a network;
an image processing device installed on a local network that is connected to the network through a firewall;
a relay server, installed on the local network, that relays communication between the image processing device and the application server; and
a connection mediation server, installed on the network, that transmits a connection request to the relay server according to a communication request from the application server to cause the relay server to connect to the application server, wherein
the application server:
adds, to the communication request, identification information that comprises a predetermined process to be performed by the image processing device and an amount of data to be transmitted, and
transmits the communication request to the connection mediation server,
the connection mediation server:
accepts the communication request received from the application server, and
upon accepting the communication request, transmits a connection request to the relay server,
upon receiving the connection request, the relay server establishes a connection state between the application server and the image processing device, and
upon accepting the communication request for causing the image processing device to perform the predetermined process, the connection mediation server transmits the connection request to the relay server according to the communication request, and
upon accepting a new communication request for the image processing device while the predetermined process is being performed by the image processing device, the connection mediation server determines based on the identification information whether the predetermined process is update of firmware,
upon determining that the predetermined process is not the update of firmware, the connection mediation server determines whether the predetermined process is a process having the amount of data equal to or greater than a predetermined value, and
upon determining that the predetermined process is at least one of the update of firmware and the process having the amount of data equal to or greater than the predetermined value, the connection mediation server determines that the predetermined process either delays communication between the image processing device and an external device or makes the communication impossible and refrains from transmitting the connection request according to the new communication request to the relay server.

2. The image processing system according to claim 1, wherein
the relay server further:
regularly monitors a state of the image processing device, and
transmits, to the connection mediation server, status information according to the detected state of the image processing device,
the connection mediation server further holds the status information received from the relay server, and
upon accepting the communication request for the image processing device when the status information indicates that the predetermined process has ended, the connection mediation server transmits a connection request according to the accepted communication request to the relay server.

3. The image processing system according to claim 2, wherein the connection mediation server further refers to the status information and transmits a response according to the status information to the application server, when the connection request according to the communication request for the image processing device is not transmitted to the relay server.

4. The image processing system according to claim 3, wherein the connection mediation server adds a processing time required for the predetermined process to the response, and to transmit the response to the application server.

5. The image processing system according to claim 2, wherein, upon detecting a change in the state of the image processing device, the relay server transmits the status information to the connection mediation server.

6. The image processing system according to claim 2, wherein
the connection mediation server further places the communication request for the image processing device in standby when a connection request according to the communication request is not transmitted, and
upon receiving, from the relay server, the status information indicating that the predetermined process has ended at the image processing device, the connection mediation server transmits a connection request to the relay server according to the communication request that is placed in standby.

7. The image processing system according to claim 1,
wherein a first image processing device and a second image processing device different from the first image processing device are installed on the local network, and
when the predetermined process is being performed at the first image processing device, the connection mediation server transmits a connection request for the second image processing device to the relay server.

8. The image processing system according to claim 1, wherein when the connection mediation server does not transmit the connection request according to the new communication request to the relay server, the connection mediation server returns, to the application server that has transmitted the new communication request, a response indicating that a connection between the application server that has transmitted the new communication request and the image processing device cannot be established.

9. A connection mediation server that transmits a connection request to a relay server that relays, according to a communication request from an application server installed on a network, communication between the application server and an image processing device installed on a local network connected to the network through a firewall, and causes the relay server to connect to the application server, the connection mediation server being installed on the network and comprising:
a request accepting circuit that accepts the communication request received from the application server, wherein the communication request comprises identification information comprising a predetermined process to be performed by the image processing device and an amount of data to be transmitted; and
a connection request circuit that transmits the connection request to the relay server when the communication request is accepted by the request accepting circuit, wherein, when the communication request for causing the image processing device to perform the predetermined process is accepted by the request accepting circuit, the connection request circuit transmits the connection request to the relay server according to the communication request, and when a new communication request for the image processing device is accepted by the request accepting circuit while the predetermined process is being performed by the image processing device, the request accepting circuit determines based on the identification information whether the predetermined process is update of firmware, upon determining that the predetermined process is not the update of firmware, the request accepting circuit determines whether the predetermined process is a process having the amount of data equal to or greater than a predetermined value, and upon determining that the predetermined process is at least one of the update of firmware and the process having the amount of data equal to or greater than the predetermined value, the request accepting circuit determines that the predetermined process either delays communication between the image processing device and an external device or makes the communication impossible, and the connection request circuit refrains from transmitting the connection request according to the new communication request to the relay server.

10. The connection mediation server according to claim 9, further comprising:

an information holding circuit that holds status information according to a state of the image processing device received from the relay server; and a response transmission circuit that refers to the status information that is held by the information holding circuit and transmits a response according to the status information to the application server, when the connection request according to the communication request for the image processing device is not transmitted to the relay server by the connection request circuit.

11. The connection mediation server according to claim 10, wherein the response transmission circuit adds a processing time required for the predetermined process to the response, and transmits the response to the application server.

12. The connection mediation server according to claim 9, further comprising:

a standby circuit that places the communication request for the image processing device in standby when a connection request according to the communication request is not transmitted by the connection request circuit, wherein, when the connection mediation server receives, from the relay server, the status information indicating that the predetermined process has ended at the image processing device, the connection request circuit transmits a connection request to the relay server according to the communication request that is placed in standby by the standby circuit.

13. A non-transitory recording medium storing a computer readable program to be executed by a connection mediation server that transmits a connection request to a relay server that relays, according to a communication request from an application server installed on a network, communication between the application server and an image processing device installed on a local network connected to the network through a firewall, and causes the relay server to connect to the application server, wherein the connection mediation server is installed on the network and the program causes the connection mediation server to execute:

accepting the communication request received from the application server, wherein the communication request comprises identification information comprising a predetermined process to be performed by the image processing device and an amount of data to be transmitted; and upon accepting the communication request, transmitting a connection request to the relay server, wherein the connection mediation server further executes:

upon accepting the communication request for causing the image processing device to perform the predetermined process, transmitting the connection request to the relay server according to the communication request, and upon accepting a new communication request for the image processing device while the predetermined process is being performed by the image processing device, determining based on the identification information whether the predetermined process is update of firmware, upon determining that the predetermined process is not the update of firmware, determining whether the predetermined process is a process having the amount of data equal to or greater than a predetermined value, and upon determining that the predetermined process is at least one of the update of firmware and the process having the amount of data equal to or greater than the predetermined value, determining that the predetermined process either delays communication between the image processing device and an external device or makes the communication impossible, and refraining from transmitting the connection request according to the new communication request to the relay server.

14. The non-transitory recording medium storing a computer readable program according to claim 13, the program for further causing the connection mediation server to execute:

(c) holding status information according to a state of the image processing device received from the relay server; and (d) referring to the status information that is held in (c) and transmitting a response according to the status information to the application server, when the connection request according to the communication request for the image processing device is not transmitted to the relay server.

* * * * *